United States Patent
Crockett et al.

[11] Patent Number: 6,088,697
[45] Date of Patent: Jul. 11, 2000

[54] DYNAMIC CHANGE MANAGEMENT IN AN EXTENDED REMOTE COPY OPERATION

[75] Inventors: Robert Nelson Crockett; Ronald Maynard Kern; Gregory Edward McBride, all of Tucson, Ariz.

[73] Assignee: International Business Machines Corporation, Armonk, N.Y.

[21] Appl. No.: 08/993,545

[22] Filed: Dec. 18, 1997

[51] Int. Cl.[7] .................................................. G06F 17/30
[52] U.S. Cl. .............................. 707/10; 364/229; 711/162
[58] Field of Search ..................... 707/10, 9, 8; 364/238, 364/241, 229; 711/162; 710/8, 38; 714/6, 13

[56] References Cited

U.S. PATENT DOCUMENTS

| | | | |
|---|---|---|---|
| 4,837,680 | 6/1989 | Crockett et al. | 364/229 |
| 5,504,861 | 4/1996 | Crockett et al. | 364/229 |
| 5,574,950 | 11/1996 | Hathorn et al. | 710/8 |
| 5,592,618 | 1/1997 | Micka et al. | 711/162 |
| 5,778,393 | 7/1998 | Blea et al. | 364/229 |

*Primary Examiner*—Wayne Amsbury
*Assistant Examiner*—Thu-Thao Havan
*Attorney, Agent, or Firm*—David W. Victor; Yolanda Raynes & Victor LLP

[57] ABSTRACT

A method, apparatus, and article of manufacture for dynamic change management in an extended remote copy system. A primary data mover monitors changes made to a primary data volume resulting from write I/O operations, wherein the changes are reflected in a data structure maintained by the primary data mover. The primary data mover performs a multi-level analysis on the data structure to discard a portion of the changes therein, so that the changes that have been applied to a secondary data volume are discarded from the data structure and the changes that have not been applied to the secondary data volume are maintained in the data structure.

33 Claims, 5 Drawing Sheets

| PRIMARY DEVICE UNIT ADDRESS | | | |
|---|---|---|---|
| CYLINDER #/ HEAD # *306* | SECTOR # *308* | UPDATE FLAG *310* | ACKNOWLEDGMENT FLAG *312* |
| | | | |
| | | | |
| | | | |
| | | | |
| | | | |

DYNAMIC CHANGE MANAGEMENT IN AN EXTENDED REMOTE COPY OPERATION

BACKGROUND OF THE INVENTION

1. Field of the Invention

This invention relates generally to disaster recovery techniques, and more particularly, to a method for dynamic change management in an extended remote copy operation.

2. Description of Related Art

Data processing systems typically are required to store large amounts of data. Having a back-up data copy is mandatory for many businesses as data loss could be catastrophic to the business. Moreover, disaster recovery requires that the secondary copy of data be stored at a location remote from the primary data.

A known method of providing disaster protection is to back-up data to tape, on a daily or weekly basis, etc. The tape is then taken to a secure storage area that is usually located remote from the primary data location. A problem is presented in this back-up plan in that it could take days to retrieve the back-up data, and meanwhile several hours or even days of data could be lost, or worst, the storage location could be destroyed by the same disaster.

A somewhat improved back-up method would be to transmit data to a back-up location each night. This allows the data to be stored at a more remote location. Again, some data may be lost between back-ups since back-up does not occur continuously, as in the dual copy solution. Hence, a substantial data amount could be lost which may be unacceptable to some users.

More recently introduced data disaster recovery solutions include extended remote copy operations, wherein data is backed-up not only remotely, but also continuously. This continuous back-up procedure creates synchronized pairs of data volumes. In order to communicate duplexed data from one host processor to another host processor, or from one storage controller to another storage controller, or some combination thereof, a substantial amount of control data is required for realizing the process. A high overhead, however, can interfere with the performance of the extended remote copy operations.

Accordingly, there is a need in the art for a method managing extended remote copy operations in such environments. More specifically, the challenge is how to insure consistency and synchronization of data in such an environment without burdening the system with a large amount of control data or excessive control operations.

SUMMARY OF THE INVENTION

To overcome the limitations in the prior art described above, and to overcome other limitations that will become apparent upon reading and understanding the present specification, the present invention discloses a method, apparatus, and article of manufacture for dynamic change management in an extended remote copy system. A primary data mover monitors changes made to a primary data volume resulting from write I/O operations, wherein the changes are reflected in a data structure maintained by the primary data mover. The primary data mover performs a multi-level analysis on the data structure to discard a portion of the changes therein, so that the changes that have been applied to a secondary data volume are discarded from the data structure and the changes that have not been applied to the secondary data volume are maintained in the data structure.

An object of the present invention is to provide an improved design and method for performing extended remote copy operations, i.e., duplicating volumes from a primary site to a remote, secondary site.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

In an extended remote copy (XRC) environment, changes to primary and secondary data volumes are managed by a primary data mover using multi-level analysis. To perform the multi-level analysis, the primary data mover uses a data structure stored in a memory, such as a bitmap, to monitor and manage changes being made to each primary data volume. The multi-level analysis ensures that only the newest changes made to the primary data volume, and that have been successfully duplicated onto the secondary data volume, are reflected in the bitmap.

One level of the analysis is driven by an amount of changes (information change rate) and a second level of the analysis is driven by a time duration (time cycle change rate). When the information change rate for a given data volume reaches a specific threshold (controlled by the installation), the multi-level analysis causes information about old changes (e.g., those duplicated to the secondary data volume) to be discarded while maintaining information about newer changes (e.g., where the changes have not been duplicated to the second data volume or at least not have not been acknowledged as being duplicated to the second data volume). Since not all data volumes will achieve this threshold, due to a low information change rate, those volumes which fail the information change rate are evaluated by the time cycle change rate, wherein the time cycle change rate performs the evaluation when a time duration limit is reached.

This multi-stage analysis achieves the objective of minimizing the analysis and clean-up time required for volume level changes, while responding rapidly enough to minimize the re-synchronization time when a disaster recovery failure occurs. When the clean-up function is initiated by either threshold limitation being reached, all updates which have been applied to secondary volumes are reset and only the unapplied updates are maintained in the refreshed bitmap.

Extended Remote Copy System

Figure 1:
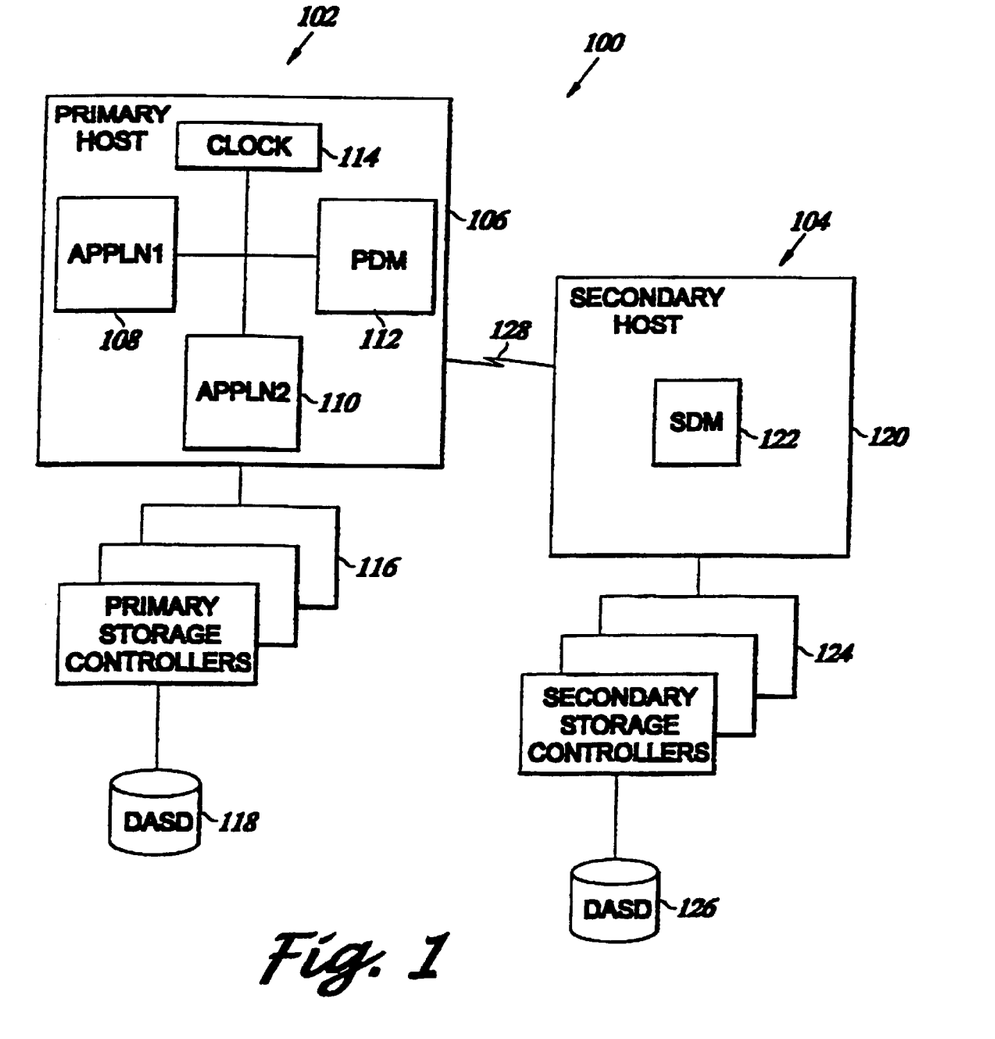
FIG. 1 depicts a system for performing Extended Remote Copy (XRC) operations, wherein the system includes a local or primary site and a remote or secondary site.

FIG. 1 depicts a system 100 for performing Extended Remote Copy (XRC) operations, wherein the system 100 includes a local or primary site 102 and a remote or secondary site 104. The primary site 102 includes a primary host processor 106, for example, IBM ESA/390 hardware and an ES/9000 environment running DFSMS/MVS software. The primary host processor 106 further includes one or more application programs (APPLN1) 108 and (APPLN2) 110, as well as a primary data mover (PDM) 112. A common sysplex clock 114 is included in the primary host processor 106 for providing a common time reference for the system, thereby ensuring that all time dependent processes are properly timed relative to one another.

One or more primary storage controllers 116, for example, IBM 3990 Model 6 storage controllers, are connected to the primary host processor 106 via one or more channels. Connected to each primary storage controller 116 is at least one string of primary DASDs 118, for example, IBM 3390 DASDs. One or more of the primary DASDs 118 form one or more primary data volumes and the primary storage controllers 116 and the primary DASDs 118 form a primary storage subsystem.

The secondary site 104, located remote from the primary site 102, is similar to the primary site 102 and includes a secondary host processor 120 having a secondary data mover (SDM) 122 operating therein. One or more secondary storage controllers 124 are connected to the secondary host processor 120 via one or more channels and one or more secondary DASDs 126 are connected to the storage controllers 124. One or more of the secondary DASDs 126 form one or more secondary data volumes and the secondary storage controllers 124 and DASDs 126 comprise a secondary storage subsystem.

The primary site 102 communicates with the secondary site 104 via a communication link 128, for example, a virtual telecommunications access method (VTAM) communication link 128. Such links can be realized by several suitable communication methods, including telephone (T1, T3 lines), radio, radio/telephone, microwave, satellite, etc.

The Extended Remote Copy operation collects data and control information from the primary storage controllers 116, so that write I/O operations to the primary DASDs 118 are duplicated to the secondary DASDs 126. The data and control information transmitted to the secondary site 104 must be sufficient such that the presence of the primary site 102 is no longer required to preserve data integrity.

The applications 108, 110 generate updates against the primary DASD 118, which are documented in update records that are generated by the primary storage controllers 116. The primary storage controllers 116 each group their respective update records and provides those update records to the PDM 112.

A READ UPDATE RECORD command is issued by the PDM 112 and can be predicated upon one of the following conditions:

(1) Primary storage controller 116 attention interrupt based upon a predetermined threshold for that primary storage controller 116;

(2) Primary host processor 106 timer interrupt based upon a predetermined time interval; or (3) Update record information indicates additional information on outstanding record updates available but not yet read.

Condition (2) uses a timer interval to control how far behind the secondary host processor 120 executes during periods of low activity. Condition (3) occurs when the PDM 112 fails to drain all record updates from the primary storage controllers 116 during a processing interval, which drives further activity for ensuring that the PDM 112 keeps up with activity on the primary storage controllers 116.

In the present invention, an analysis is performed by the PDM 112 of all update records received from all of the primary storage controllers 116. Changes to the primary DASDs 118 are managed by the PDM 112 using a bitmap, wherein a unique bitmap is assigned to each DASD 112. Thereafter, the PDM 112 ensures that only the newly changed data or updates are reflected in the bitmap using a multi-level analysis capability.

One level is driven by the amount or percentage of updates (information change rate) that occur to the primary DASD 118 and a second level is driven by a time duration (time cycle change rate) between updates to the primary DASD 118. When the information change rate for the primary DASD 118 reaches a specific threshold (controlled by the installation), the multi-level analysis performed by the PDM 112 causes information concerning old changes to be discarded while maintaining information concerning newer changes. Since not all the primary DASDs 118 will achieve this threshold, due to a low information change rate, primary DASDs 118 which fail the information change rate are evaluated by PDM 112 according to the time cycle change rate, wherein the PDM 112 performs the evaluation when a time duration limit is reached.

This multi-staged approach achieves the objective of minimizing the analysis and clean-up time required for changes to the primary DASD 118 while responding rapidly enough to minimize the re-synchronization time when a disaster recovery failure occurs. When the clean-up function of the PDM 112 is initiated by either threshold limitation being reached, all updates which have been applied to secondary DASDs 126 are reset and only the unapplied updates are maintained in the refreshed bitmap.

Update Records

Figure 2:
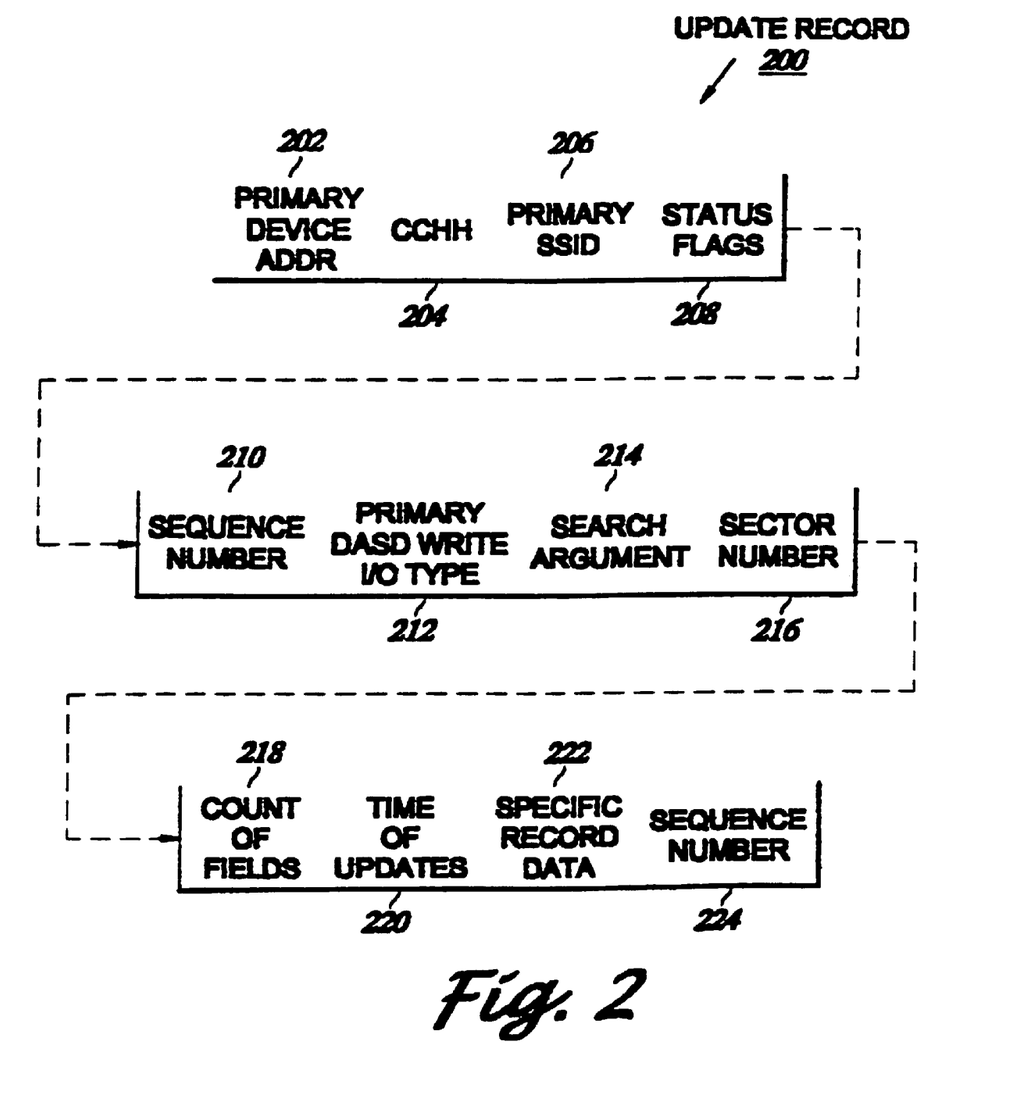
FIG. 2 illustrates an update record 200 according to the present invention.

FIG. 2 illustrates an update record 200 according to the present invention. The update record 200 is generated by the primary storage controllers 116 and collected by the PDM 112. A primary device unit address 202 indicates the actual primary DASD 118 where the update occurred. A cylinder number/head number (CCHH) 204 indicates a location on primary DASD 118 for each update. A primary SSID 206 comprises a primary storage controller 116 session identifier. Status flags 208 provide status information regarding whether specific record data 222 follow in the update record 200. Sequence numbers 210 and 224 assign a number to each update record 200 to indicate whether the entire update record 200 has been read (i.e., all specific record data 222 has been transferred to the PDM 112). A primary DASD write I/O type 212 is an operation indicator identifying the type of update performed on the primary DASD 118, wherein the operation indicators include: update write; format write; partial track records follow; full track data follows; erase command performed; or write any performed. Search argument 214 indicates the initial positioning information for the first specific data record 222. A sector number 216 identifies the sector of the primary DASD 118 that was updated. Count of fields 218 describes a number of specific record data fields 222 that follow. Time of updates 220 provides a timestamp when the update on the primary DASD 118 occurred. Specific record data 222 provides a count/key/data (CKD) field for the update. Lastly, the sequence number 224 is compared to the sequence number 310 for indicating whether the entire update record 300 was transferred to the PDM 112.

Bitmaps

Figure 3:
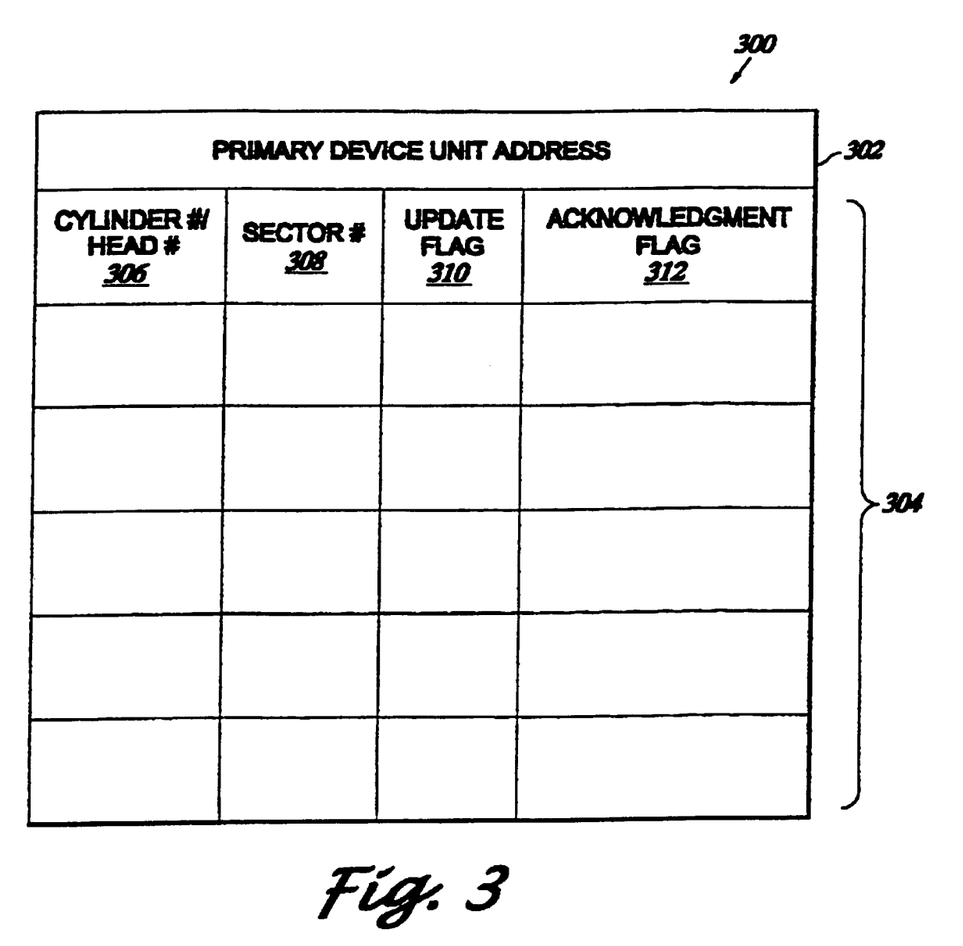
FIG. 3 illustrates an exemplary bitmap used by a primary data mover to monitor and manage update records according to the present invention.

FIG. 3 illustrates an exemplary bitmap 300 used by the PDM 112 to monitor and manage update records 200 according to the present invention. Each bitmap 300 is identified by a primary device unit address 302, which associates the bitmap 300 with a particular primary DASD 118. Each bitmap 300 also includes a plurality of entries 304 that represents whether a update as occurred on the primary DASD 118. Each entry 304 includes four values: (1) a cylinder number/head number (CCHH) 306 indicates a cylinder/head location on the primary DASD 118; (2) a sector number 308 identifies the sector of the primary DASD 118; (3) an update flag 310 indicates whether the sector of the primary DASD 118 has been updated since the last cleaning of the bitmap 300 performed by the PDM 112 (a value of "true" indicates the sector has been updated and a value of "false" indicates the sector has not been updated); and (4) an acknowledgment flag 312 indicates whether the secondary storage controller 124 has acknowledged that corresponding update record 200 has been applied to the secondary DASDs 126, thereby duplicating the changes made to the primary DASD 118.

Logic for Performing Multi-level Analysis of Updates

FIGS. 4A, 4B, 4C, and 4D together are a flowchart illustrating the logic performed in performing the multi-level analysis of updates according to the present invention.

Figure 4A:
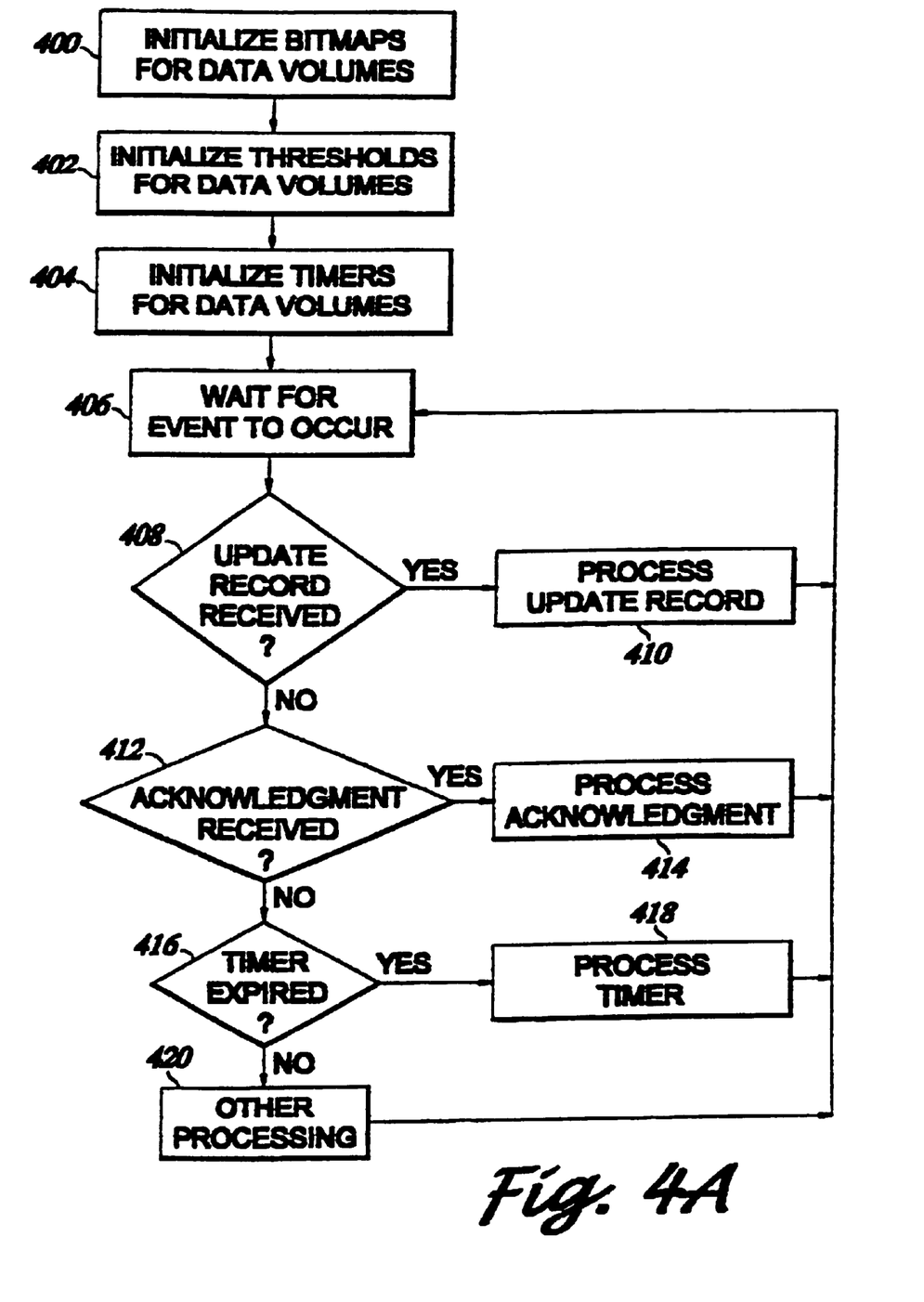
FIGS. 4A, 4B, 4C, and 4D together are a flowchart illustrating the logic performed in performing the multi-level analysis of updates according to the present invention.

Referring to FIG. 4A, Block 400 represents the PDM 112 initializing all the bitmaps 300 for all of the primary DASDs 118 being monitored. This initialization step may involve assigning a primary device unit address 302 to the bitmap 300, creating the various entries 304 in the bitmaps 300, and setting the various fields for each entry 304. Alternatively, this initialization step may involve retrieving pre-existing stored bitmaps 300 from a non-volatile storage device in a "restart" mode.

Block 402 represents the PDM 112 initializing a specific threshold of updates for each of the bitmaps 300 to reflect the threshold limits (which may be different for different ones of the primary DASDs 118) used by the information change rate analysis.

Block 404 represents the PDM 112 initializing a timer for each of the bitmaps 300 to reflect the time duration limits (which may be different for different ones of the primary DASDs 118) used by the time cycle change rate analysis.

Block 406 represents the PDM 112 waiting for an event to occur. Thereafter, Blocks 408–420 are performed.

Block 408 is a decision block that represents the PDM 112 determining whether the event was the receipt of an update record 200 from a primary storage controller 116. If so, control transfers to Block 410; otherwise, control transfers to Block 412.

Figure 4B:
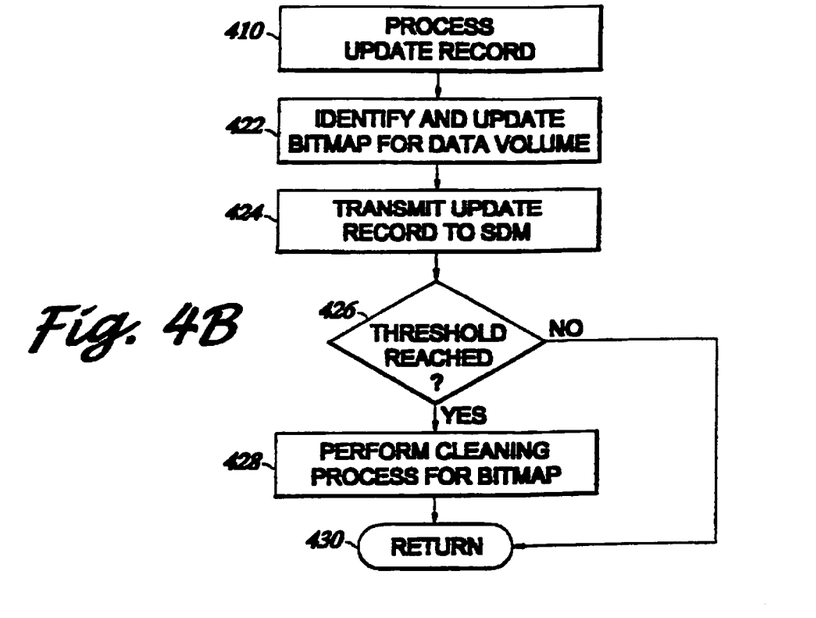

Block 410 represents the PDM 112 processing the update record 200, as described further in FIG. 4B. Thereafter, control transfers back to Block 406.

Block 412 is a decision block that represents the PDM 112 determining whether the event was the receipt of an acknowledgment for a particular update record 200 from the secondary storage controller 124 by way of the secondary PDM 122. If so, control transfers to Block 414; otherwise, control transfers to Block 416.

Figure 4C:
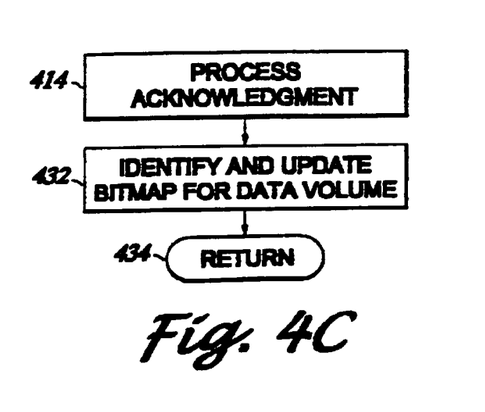

Block 414 represents the PDM 112 processing the acknowledgment, as described further in FIG. 4C. Thereafter, control transfers back to Block 406.

Block 416 is a decision block that represents the PDM 112 determining whether the event was the expiration of a timer for a particular bitmap 300. If so, control transfers to Block 418; otherwise, control transfers to Block 420.

Figure 4D:
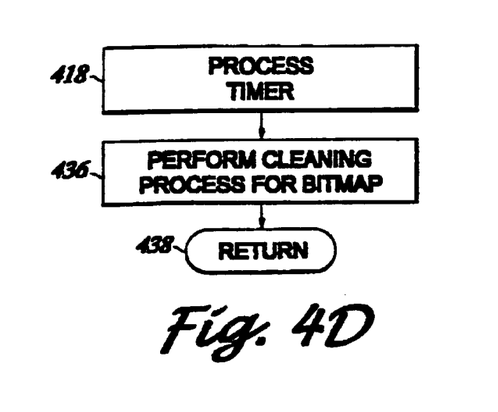

Block 418 represents the PDM 112 processing the timer, as described further in FIG. 4D. Thereafter, control transfers back to Block 406.

Block 420 represents the PDM 112 performing other processing. Thereafter, control transfers back to Block 406.

Referring to FIG. 4B, Block 410 is again represented as in FIG. 4A.

Block 422 represents the PDM 112 using the update record 200 to identify and update a particular bitmap 300. The PDM 112 uses the primary device unit address 202 of the update record 200 to identify the particular bitmap 300 by matching its primary device unit address 302. The PDM 112 then matches both the cylinder number/head number (CCHH) 204 and the sector number 216 of the update record 200 with the cylinder number/head number (CCHH) 306 and the sector number 308 of a particular entry 304 of the bitmap 300. Upon identifying the particular entry 304 of the bitmap 300, the PDM 112 then sets the update flag 310 to a "true" value and the acknowledgment flag 312 to a "false" value. Block 422 also represents the PDM 112 incrementing the information change rate value in response to receiving the update record 200.

Block 424 represents the PDM 112 transmitting the update record 200 to the SDM 122 at the secondary site 104. This may also include other intermediate steps performed by the PDM 112, such as journalization and/or the formation of consistency groups to ensure that the updates are applied to the secondary DASDs 126 in the order they occurred on the primary DASDs 116.

Block 426 is a decision block that represents the PDM 112 determining whether the information change rate value has reached a specified threshold. If so, control transfers to Block 428; otherwise, control transfers to Block 430.

Block 428 represents the PDM 112 performing a cleaning process. This cleaning process resets the update flag 310 and acknowledgment flag 312 in all entries 304 in the bitmap 300 that correspond to update records that have been applied to the secondary DASDs 126. However, this cleaning process does not reset those entries 304 that that correspond to update records that have not been applied to the secondary DASDs 126 (i.e., those update records 200 that have not been acknowledged to the PDM 112 by the secondary storage controllers 124 by way of the secondary PDM 122). This cleaning process also resets the an information change rate value, as well as the timer for the particular bitmap 300.

Block 430 represents an end to the logic of FIG. 4B.

Referring to FIG. 4C, Block 414 is again represented as in FIG. 4A.

Block 432 represents the PDM 112 using the acknowledgment associated with a particular update record 200 to identify and update a particular bitmap 300. The PDM 112 uses the primary device unit address 202 of the update record 200 to identify the particular bitmap 300 by matching its primary device unit address 302. The PDM 112 then matches both the cylinder number/head number (CCHH) 204 and the sector number 216 of the update record 200 with the cylinder number/head number (CCHH) 306 and the sector number 308 of a particular entry 304 of the bitmap 300. Upon identifying the particular entry 304 of the bitmap 300, the PDM 112 then sets the acknowledgment flag 312 to a "true" value.

Block 430 represents an end to the logic of FIG. 4C.

Referring to FIG. 4D, Block 418 is again represented as in FIG. 4A.

Block 436 represents the PDM 112 performing a cleaning process. This cleaning process resets the update flag 310 and acknowledgment flag 312 in all entries 304 in the bitmap 300 that correspond to update records that have been applied to the secondary DASDs 126. However, this cleaning process does not reset those entries 304 that that correspond to update records that have not been applied to the secondary DASDs 126 (i.e., those update records 200 that have not been acknowledged to the PDM 112 by the secondary storage controllers 124 by way of the secondary PDM 122). This cleaning process also resets the an information change rate value, as well as the timer for the particular bitmap 300.

Block 430 represents an end to the logic of FIG. 4D.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to the hardware and software configuration illustrated herein. For example, other mainframes, minicomputers, personal computers, or networks of computers could be used with the present invention. In another example, peripherals other than those illustrated herein could benefit from the present invention.

In alternative embodiments of the present invention, data structures different from those described herein could be used without departing from the scope of the present invention. For example, two bitmaps could be used instead of just one bitmap. Both bitmaps are initialized to zeros. Values are set to ones in the first bitmap and the second bitmap is used as a back-up bitmap. For example, when a threshold is met, values from the first bitmaps are copied to the second bitmaps. The invention then performs the multi-level analysis to determine how to clear the first bitmap.

In alternative embodiments of the present invention, a journal could be maintained to track the activity at the primary site. The journal may be stored at the primary site or at a remotely located, non-volatile storage system. After a system failure, the journal may be compared with the bitmap to determine whether the updated volumes of data were transferred from the primary site to the secondary site.

In alternative embodiments of the present invention, other logic than that described herein could be performed without departing from the scope of the present invention. For example, the invention need not be restricted to the exact steps or elements illustrated herein. Further, the logic could be performed in hardware rather than in software as described herein, and the bitmaps could be stored in other types of memory to facilitate such an approach.

In summary, a method, apparatus, and article of manufacture for dynamic change management in an extended remote copy system has been described. A primary data mover monitors changes made to a primary data volume resulting from write I/O operations, wherein the changes are reflected in a data structure maintained by the primary data mover. The primary data mover performs a multi-level analysis on the data structure to discard a portion of the changes therein, so that the changes that have been applied to a secondary data volume are discarded from the data structure and the changes that have not been applied to the secondary data volume are maintained in the data structure.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An extended remote copying system, comprising:
   (a) a primary processor executing at least one computer program that generates write I/O operations;
   (b) a primary storage subsystem coupled to the primary processor and comprised of one or more primary storage controllers and one or more primary data volumes for performing the write I/O operations generated by the computer program; and
   (c) a primary data mover executed by the primary processor for monitoring changes made to the primary data volume resulting from the write I/O operations, indicating the changes to the primary data volume in a data structure, performing a multi-level analysis to determine whether one of at least two thresholds has been exceeded, discarding indication in the data structure of the changes that have been applied to a secondary data volume if one of the thresholds has been exceeded, wherein changes that have not been applied to the secondary data volume are maintained in the data structure.

2. The system of claim 1, further comprising:
   a secondary host processor coupled to the primary processor and located remotely therefrom;
   one or more secondary storage controllers coupled to the secondary processor and the secondary data volume for performing write I/O operations to the secondary data volume; and
   a secondary data mover executed by the secondary processor for receiving data and control information from the primary data mover and for generating write I/O operations for the secondary storage controllers in response thereto, wherein the write I/O operations duplicate the changes performed by the primary storage controllers that are monitored and analyzed by the primary data mover.

3. The system of claim 1, wherein the primary data mover further comprises means for discarding a first portion of the changes to the primary data volume reflected in the data structure when a first threshold value is met and means for discarding a second portion of the changes to the primary data volume reflected in the data structure when a second threshold is met.

4. The system of claim 1, wherein one of the thresholds used in the multi-level analysis is based on an information change rate.

5. The system of claim 4, wherein the information change rate comprises an amount of changes to the primary data volume.

6. The system of claim 4, wherein the primary data mover further comprises means for discarding indication in the data structure of the changes that have been applied to the secondary data volume while maintaining indication in the data structure of the changes that have not been applied to the secondary data volume when the information change rate reaches 7 a specific threshold.

7. The system of claim 1, wherein one of the thresholds used in the multi-level analysis is based on a time cycle change rate.

8. The system of claim 7, wherein the time cycle change rate comprises a time duration.

9. The system of claim 7, wherein the primary data mover further comprises means for discarding indication in the data structure of the changes that have been applied to the secondary data volume while maintaining indication in the data structure of the changes that have not been applied to the secondary data volume when the information change rate reaches a specific threshold.

10. The system of claim 1, wherein the data structure is a bitmap.

11. The system of claim 1, wherein the data structure is identified by a primary device unit address for the primary data volume.

12. The system of claim 1, wherein the data structure is comprised of one or more entries, and each of the entries includes one or more values selected from a group comprising: a cylinder number/head number that indicates a location of the change on the primary data volume, a sector number that identifies a sector of the change on the primary data volume, an update flag that indicates whether the sector of the primary data volume has been updated since a last cleaning of the bitmap was performed, and an acknowledgment flag that indicates whether the secondary data volume has acknowledged that the change has been applied thereto.

13. The system of claim 1, wherein the primary data mover further comprises means for cleaning the data structure.

14. The system of claim 13, wherein the means for cleaning further comprises means for resetting the update flag and the acknowledgment flag for the entries in the data structure that correspond to changes that have been applied to the secondary data volume.

15. The system of claim 13, wherein the means for cleaning further comprises means for not resetting the update flag and the acknowledgment flag for the entries in the data structure that correspond to changes that have not been applied to the secondary data volume.

16. The system of claim 15, wherein the changes that have not been applied to the secondary data volume comprise changes that have not been acknowledged.

17. The system of claim 15, wherein the primary data mover further comprises means for resetting the information change rate.

18. The system of claim 15, wherein the primary data mover further comprises means for resetting the time cycle change rate.

19. The system of claim 18, wherein the means for resetting comprises means for resetting a timer for the time cycle change rate.

20. A method for monitoring changes to data volumes in a computer system, comprising:
monitoring changes to a primary data volume;
indicating the changes to the primary data volume in a data structure; and
performing a multi-level analysis to determine whether one of at least two thresholds has been exceeded;
discarding indication in the data structure of the changes that have been applied to a secondary data volume if one of the thresholds has been exceeded, wherein changes that have not been applied to the secondary data volume are maintained in the data structure.

21. The method of claim 20, further comprising discarding a first portion of the changes to the primary data volume reflected in the data structure when a first threshold value is met and discarding a second portion of the changes to the primary data volume reflected in the data structure when a second threshold is met.

22. The method of claim 20, wherein one of the thresholds used in the multi-level analysis is based on an information change rate.

23. The method of claim 22, wherein discarding indication in the data structure of the changes further comprises discarding indication in the data structure of the changes that have been applied to the secondary data volume while maintaining indication in the data structure of the changes that have not been applied to the secondary data volume when the information change rate reaches a specific threshold.

24. The method of claim 20, wherein one of the thresholds used in the multi-level analysis is based on a time cycle change rate.

25. The method of claim 20, wherein the data structure is comprised of one or more entries, and each of the entries includes one or more values selected from a group comprising: a cylinder number/head number that indicates a location of the change on the primary data volume, a sector number that identifies a sector of the change on the primary data volume, an update flag that indicates whether the sector of the primary data volume has been updated since a last cleaning of the bitmap was performed, and an acknowledgment flag that indicates whether the secondary data volume has acknowledged that the change has been applied thereto.

26. The method of claim 25, further comprising:
cleaning the data structure; and
resetting the update flag and the acknowledgment flag for the entries in the data structure that correspond to changes that have been applied to the secondary data volume after cleaning the data structure.

27. An article of manufacture embodying logic that performs a method for monitoring changes to data volumes in a computer system, the method comprising:
(a) monitoring changes to a primary data volume;
(b) indicating the changes to the primary data volume in a data structure; and
(c) performing a multi-level analysis to determine whether one of at least two threshholds has been exceeded; and
(d) discarding indication in the data structure of the changes that have been applied to a secondary data volume if one of the thresholds has been exceeded, wherein changes that have been applied to the secondary data volume are maintained in the data structure.

28. The article of manufacture of claim 27, further comprising discarding a first portion of the changes to the primary data volume reflected in the data structure when a first threshold value is met and discarding a second portion of the changes to the primary data volume reflected in the data structure when a second threshold is met.

29. The article of manufacture of claim 27, wherein one of the thresholds used in the multi-level analysis is based on an information change rate.

30. The article of manufacture of claim 29, wherein discarding indication in the data structure of the changes further comprises discarding indication in the data structure of the changes that have been applied to the secondary data volume while maintaining indication in the data structure of the changes that have not been applied to the secondary data volume when the information change rate reaches a specific threshold.

31. The article of manufacture of claim 27, wherein one of the thresholds used in the multi-level analysis is based on a time cycle change rate.

32. The article of manufacture of claim 27, wherein the data structure is comprised of one or more entries, and each of the entries includes one or more values selected from a group comprising: a cylinder number/head number that indicates a location of the change on the primary data volume, a sector number that identifies a sector of the change on the primary data volume, an update flag that indicates whether the sector of the primary data volume has been updated since a last cleaning of the bitmap was performed, and an acknowledgment flag that indicates whether the secondary data volume has acknowledged that the change has been applied thereto.

33. The article of manufacture of claim 32, further comprising:

cleaning the data structure; and resetting the update flag and the acknowledgment flag for the entries in the data structure that correspond to changes that have been applied to the secondary data volume after cleaning the data structure.

* * * * *

UNITED STATES PATENT AND TRADEMARK OFFICE
CERTIFICATE OF CORRECTION

PATENT NO. : 6,088,697
DATED : July 11, 2000
INVENTOR(S) : Crockett et al.

It is certified that error appears in the above-identified patent and that said Letters Patent is hereby corrected as shown below:

Title page,
Under "*Attorney, Agent, or Firm*", delete "Yolanda" and insert Konrad Column 10,
Line 49, after "that have" insert not Signed and Sealed this Eighth Day of January, 2002

Attest:

JAMES E. ROGAN
*Attesting Officer*

*Director of the United States Patent and Trademark Office*